No. 671,913. Patented Apr. 9, 1901.
H. ASHLEY & H. M. MARTIN.
LIQUID METER.
(Application filed Jan. 21, 1901.)
(No Model.) 2 Sheets—Sheet 2.
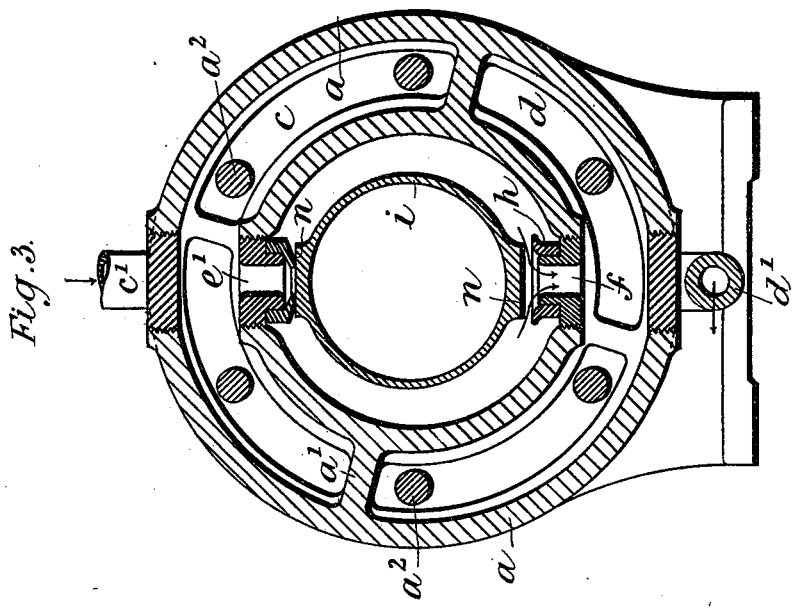
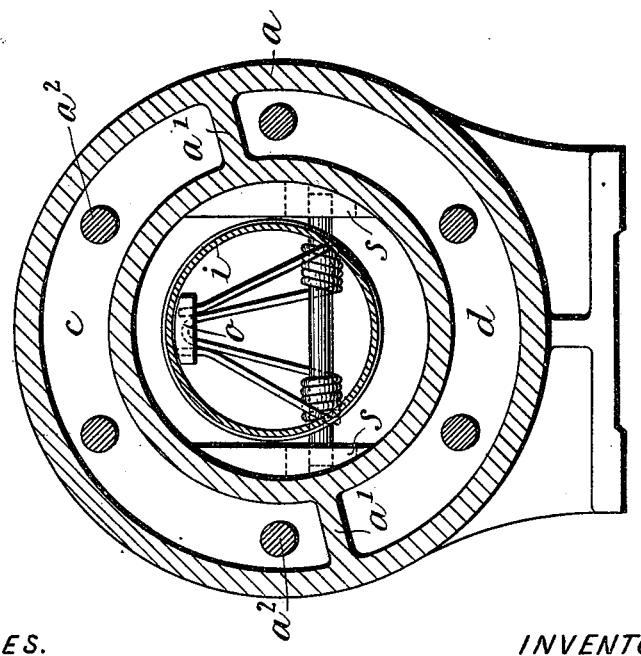
WITNESSES.
Albert Jones
Samuel Percival
INVENTORS
Herbert Ashley
Harold M. Martin
By their Attorneys
Wheatley & Mackenzie

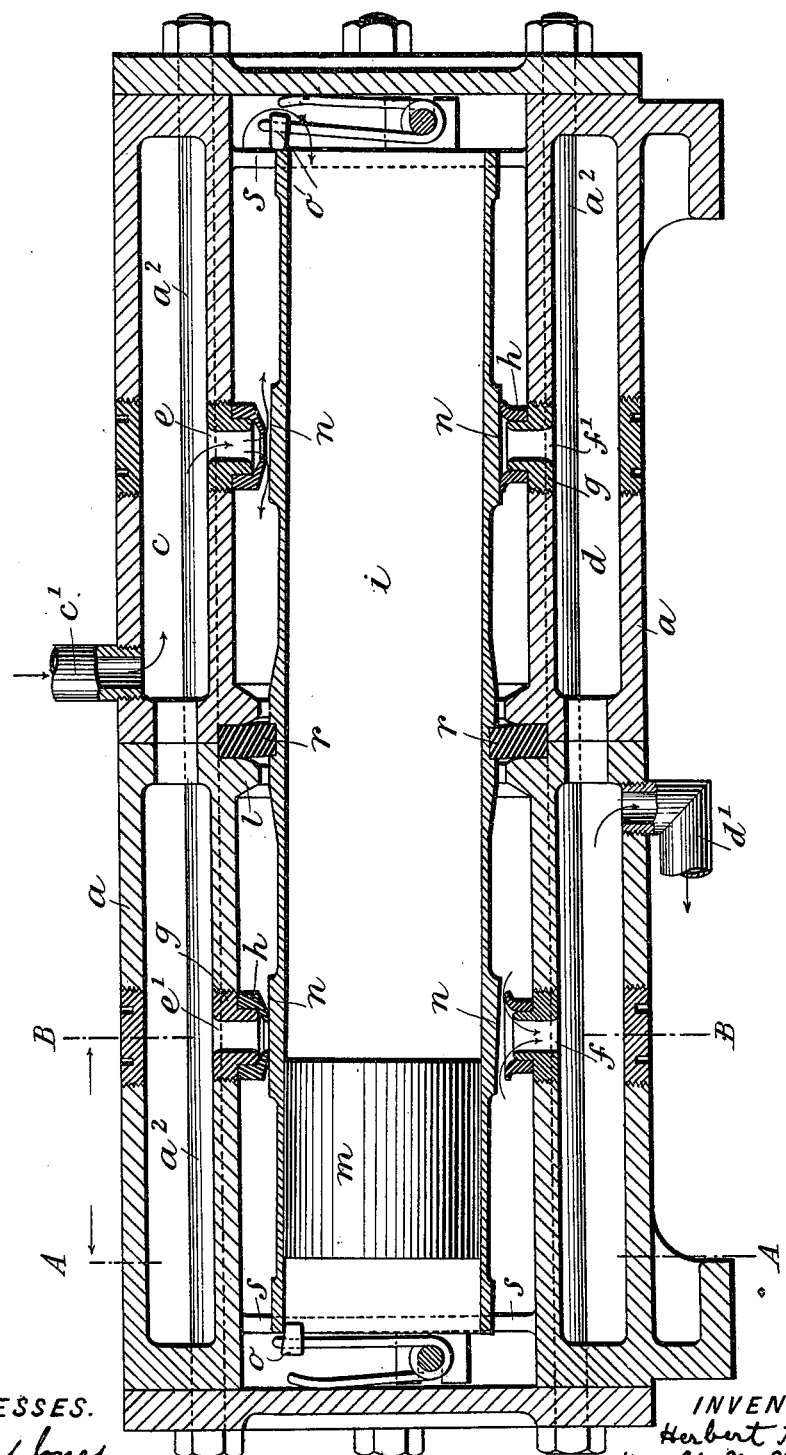

UNITED STATES PATENT OFFICE.

HERBERT ASHLEY, OF STAMFORD HILL, AND HAROLD MEDWAY MARTIN, OF WESTMINSTER, ENGLAND.

LIQUID-METER.

SPECIFICATION forming part of Letters Patent No. 671,913, dated April 9, 1901.

Application filed January 21, 1901. Serial No. 44,133. (No model.)

*To all whom it may concern:*

Be it known that we, HERBERT ASHLEY, residing at 114 Bethune road, Stamford Hill, in the county of Middlesex, and HAROLD MEDWAY MARTIN, residing at 35 and 36 Bedford street, in the city of Westminster, England, subjects of the Queen of Great Britain and Ireland, have invented certain new and useful Improvements in Liquid-Meters, (for which we have made application for patent in Great Britain, No. 6,391, on the 5th of April, 1900;) and we do hereby declare the following to be a full, clear, and exact description of the invention, such as will enable others skilled in the art to which it appertains to make and use the same.

This invention for improvements in liquid-meters relates to meters of the oscillating-cylinder type, and has for its object to provide a meter of simple construction with few working parts which shall work noiselessly and smoothly, absorb a very small amount of the water-pressure, and shall accurately register the smallest flow of water as well as the largest; and it consists of a new arrangement of measuring cylinder and casing whereby a fixed part of the casing becomes practically a clearance-space of the oscillating measuring-cylinder and in putting the valves of the meter on the casing and in communication with the fixed clearance-space.

In carrying out this invention an open-ended measuring-cylinder is provided with a free or detached piston and is mounted to oscillate to a slight extent in a casing divided into two parts by a diaphragm on which the cylinder oscillates, so that the two parts of the casing become practically fixed clearance or idle spaces to the oscillating measuring-cylinder. The valves are placed on the fixed parts and can consequently be of the most simple type, it being only necessary to open and close them. The so-called "clearance" or "dead" space forms the closed connection between the valves and the moving cylinder, and as the whole meter is worked by the difference of the weight of the piston and the displaced water the entire elimination of valve friction is a great advantage. The casing is provided with inlet and outlet channels, inlet and outlet passages from the channels to each part of the casing opened and closed alternately by the cylinder as it oscillates, and a detached piston working in the cylinder and adapted to oscillate the same by the difference between its weight and that of the displaced water. Catches or their equivalents hold the cylinder at either of its extreme points of oscillation and are adapted to be released by the piston at the ends of its strokes and to automatically reëngage when the cylinder reassumes the extreme positions.

In the accompanying sheet of illustrative drawings, Figure 1 is a longitudinal section of a liquid-meter constructed according to this invention. Fig. 2 is a transverse section at A A, Fig. 1; and Fig. 3 is a similar section at B B.

The casing $a$ consists of two concentric cylinders having a web $a'$, dividing the annular space between the cylinders into two parts that form the inlet channel or space $c$, provided with the inlet $c'$ for the liquid to be measured, and the outlet channel or space $d$, with the outlet $d'$ for the measured liquid. The casing is divided by a central transverse division into two symmetrical halves that are firmly secured together by the bolts $a^2$, passing through the annular spaces $c$ and $d$. By this construction the water-channels are large, the only reduction being actually at the valves themselves instead of the water being conveyed through long narrow passages connecting the usual trunnions to the ends of the cylinder.

The open-ended measuring-cylinder $i$ is mounted so that it can oscillate to a small extent in a flexible diaphragm $r$, that is gripped between the two halves of the casing and so divides the casing into two parts. The ends of the cylinder are guided vertically by the ribs $s$. The piston $m$ is made heavy and slides in the measuring-cylinder $i$, but is perfectly free, not being connected positively in any way. By this construction the two parts of the inner casing becomes practically-fixed parts of the clearance dead or idle spaces of the ends of the measuring-cylinder.

An inlet-passage $e$ or $e'$ is formed from the annular inlet-channel $c$ to each part of the casing and an outlet-passage $f$ or $f'$ is formed from each part of the casing to the outlet-channel $d$. One inlet and one outlet passage thus communicates with each end of the measuring-cylinder. Each inlet and outlet passage $e\ e'\ f\ f'$ consists of a nipple $g$, screwed into the casing and surrounded by a flanged rubber ring $h$. In order to readily remove the nipple $g$, with its rubber ring $h$, screwplugs $p$ are provided in the outer concentric cylinder of the casing $a$ opposite the nipple $g$.

The measuring-cylinder $i$ oscillates on its central diaphragm approximately in a vertical plane, the guide-ribs $s$ being vertical and alternately opens and closes the inlet and outlet passages, the faces or projections $n$ on the measuring-cylinder coming against the rubber rings $h$ on the nipples $g$ and effecting a tight closing. The flanges of the rubber rings $h$ are formed as shown, so that the water-pressure tends to keep them tight, the outlet-rings having outward flanges and the inlet-rings having inward flanges. To maintain the cylinder $i$ in either of its extreme positions and keep one pair of passages firmly closed while the piston is traveling from one end to the other, spring-catches $o\ o'$ are mounted at each end of the casing and automatically engage in each end of the cylinder. The catch $o$ is pushed out of engagement by the piston to release the cylinder as the piston reaches that end of its stroke and when the released cylinder has completed its oscillation the other catch $o'$ reëngages.

In operation, supposing the parts to be in the position shown and full of liquid, the liquid enters the inlet-channel $c$ and passes through the open inlet-passage $e$ and, flowing in the direction of the arrows, forces the piston to the left-hand end of the measuring-cylinder, where it pushes back the spring-catch $o$ and releases this end of the measuring-cylinder, which then descends under the weight of the piston and causes the right-hand end to ascend, when the catch $o'$ at this end will engage and hold it in this altered position. As the piston is forced toward the left it forces the liquid before it in the direction of the arrows through the outlet-passage $f$ at the channel $d$ and so to the outlet $d'$. The oscillating movement closes the passages $e\ f$ and opens the passages $e'\ f'$, so that the liquid is now admitted to the left end of the measuring-cylinder and then drives the piston to the right end of the measuring-cylinder, the water contained in the cylinder being forced away through the outlet-passage $f'$ and outlet-channel $d$ to the outlet $d'$. When the piston reaches the right-hand end of the cylinder $i$, the catch $o'$ is removed and the measuring-cylinder reassumes the position shown, being held by the left-hand catch $o$. The amount of water passing through the meter is, disregarding slip, proportional to the number of oscillations of the measuring-cylinder.

What we claim, and desire to secure by Letters Patent, is—

1. In an oscillating-cylinder liquid-meter, the combination with an inclosing casing, an inner oscillating open-ended measuring-cylinder and a detached piston, of a diaphragm whereby the two parts of the casing become practically the clearance, dead, or idle spaces of the oscillating measuring-cylinder.

2. In an oscillating-cylinder liquid-meter, an inclosing casing provided with inlet and outlet channels, a water-tight diaphragm dividing the casing into two parts, a cylinder held in the diaphragm and free to oscillate in the casing approximately in a vertical plane, inlet and outlet passages from the channels to each part of the casing and opened and closed by the cylinder as it oscillates, a detached piston working in the cylinder and adapted to operate the same by the difference between its weight and that of the displaced water, and holding devices for holding the cylinder in its two extreme positions adapted to be released by the piston at the ends of its strokes and to automatically reëngage when the cylinder reassumes the extreme positions.

3. An oscillating-cylinder liquid-meter consisting in two concentric cylinders having the annular space between them separated longitudinally by a partition into two compartments forming the inlet and outlet channels and divided transversely into two distinct parts, a diaphragm gripped between the two transverse halves of the casing, a cylinder held in the diaphragm and adapted to oscillate in the casing, and inlet and outlet passages formed in the inner cylinder of the casing and opened and closed by the measuring-cylinder as it oscillates.

In testimony whereof we have affixed our signatures in presence of two witnesses.

HERBERT ASHLEY.
HAROLD MEDWAY MARTIN.

Witnesses:
AGNES SOWRY,
G. F. WARREN.